March 4, 1930.

H. E. HOOVER

SUCTION CLEANER

Re. 17,615

Original Filed Nov. 1, 1922

2 Sheets-Sheet 1

Inventor
Howard Earl Hoover
By H. S. Demarest
Attorney

March 4, 1930. H. E. HOOVER Re. 17,615

SUCTION CLEANER

Original Filed Nov. 1, 1922 2 Sheets-Sheet 2

Inventor
Howard Earl Hoover

By H. S. Demarest
Attorney

Reissued Mar. 4, 1930

Re. 17,615

UNITED STATES PATENT OFFICE

HOWARD EARL HOOVER, OF GLENCOE, ILLINOIS, ASSIGNOR, BY MESNE ASSIGNMENTS, TO THE HOOVER COMPANY, OF NORTH CANTON, OHIO, A CORPORATION OF OHIO

SUCTION CLEANER

Original No. 1,624,247, dated April 12, 1927, Serial No. 598,251, filed November 1, 1922. Application for reissue filed January 28, 1929. Serial No. 335,726.

My invention relates in general to suction-cleaners and in particular to that type of cleaners illustrated and disclosed in Letters Patent No. 1,147,307, granted to Francis M. Case, and reissued as No. 14,383, October 23, 1917.

In suction-cleaners, and particularly in the type mentioned above, where the suction-nozzle is situated at a substantial distance from the floor, the floor covering is raised to the nozzle and held thereagainst by atmospheric pressure, the pressure within the nozzle being reduced by any suitable means, for example, a centrifugal fan or air-pump. Floor coverings, under such conditions, assume a wave-like formation beneath the cleaner nozzle and this wave has a crest which conforms to the shape of the cleaner-nozzle and travels along the floor covering with the cleaner as it is moved along.

This wave like formation, for the sake of convenience, will be termed the primary wave of the carpet, and is due to the combined effect of the vacuum and the raised position of the nozzle mouth above the carpet and above the floor.

In order to dislodge the dirt, especially that which is imbedded therein, from the thus raised floor covering suspended across the nozzle-mouth, means for striking the same and giving it a downward motion are employed. When the carpet is struck the dirt, on account of its inertia, remains approximately stationary, while the carpet is driven away from its original position. The vacuum returns the carpet to its old position and the air current picks up the loose and dislodged dirt and carries it to the dust-collecting receptacle. I have discovered that the best time to strike or beat the carpet is at that point of its upward travel when the carpet is returning with the maximum velocity. At this time, forced reversal of the motion by the beating blow develops the maximum inertia of the dust and has the greatest loosening effect. This latter point is very close to the most upward position of the floor-covering.

Prior to my invention, it has been customary to employ a beating agent in the form of a rotating body upon which one or more helical rows of beating elements are mounted. These elements are usually in the form of a continuous row or series of bunches of bristles arranged in a helical line around the rotating body. With this type of beater a wave-like formation, which we will term the secondary wave, is set up in the floor-covering that travels along the crest of the primary wave from one end of the rotor to the other, depending upon the direction of the helical rows of beating elements and representing the movement of the carpet as beating blows succeed each other, moving the carpet against or in opposition to its primary deflection. On account of these two motions the carpet is flexed in two directions, first, upward by the vacuum, and then downward, by the series of beating blows one after the other, which causes the free ends of the carpet pile to spread out fan-like and allow the imbedded dirt at the base of the carpet to escape, partly under the influence of inertia and partly due to the friction of the air-current between the separated threads of the carpet.

In the usual type of beating-rotor where the elements strike the carpet consecutively in their order from one end of the row to the other, the carpet pushed away by a blow of one element does not always have time to return to the most favorable position to receive a blow from the next element, with the result that the maximum inertia of the dust is not developed, because instead of most violently reversing the motion of the carpet it is more or less directly pushed down in the manner of a screw conveyor instead of by a series of positive blows delivered at the most effective time for most speedy reversal of action or most rapid acceleration away from the dust.

When using a beater of the rotary type, the number of blows struck the carpet during a unit of time I have called the periodicity of the beater, and the order in which the individual elements along the rotor strike, I have termed the sequence of the same. The periodicity and sequence indirectly fix the time interval between successive blows, the distance along the carpet between the points of contact, and thus the position of the carpet when successive blows are struck.

Periodicity, where the rotor provides a fixed number of blows per revolution, is a function of the motor-speed and the ratio of diameter of the rotor and rotor-pulleys. With a given motor speed and pulley ratio the periodicity can be adjusted by the grouping of the elements, for example, by having two or more elements strike the carpet simultaneously. Sequence is fixed by the angles between successively contacting beater arms.

It has been found by experiment that the best periodicity and sequence for one carpet may not be the best for another and that it varies according to the physical characteristics of the carpet, such as the weight, thickness, and so forth and with the character of the dirt imbedded in it.

In every case the vacuum as the returning force may be a factor in the selection of the best periodicity and sequence because there is no advantage in striking the carpet until it has returned to the most favorable position, as referred to above. It is desirable that the greatest number of blows be struck consistent with complete return of the carpet to the best position for the next blow of any one beater.

It will, therefore, be seen that with a suction-cleaner having a fixed motor speed, pulley ratio, and vacuum, the periodicity and sequence best adapted for a given carpet having a given kind of dirt therein is most conveniently secured by varying the arrangement of the beating elements on the rotor.

As stated above, it has been customary heretofore, to use as beating elements, bunches of bristles, which perform the function of both beating and sweeping the floor-covering acted upon and in order to secure a proper beating effect, the bristles must be made stiffer than is necessary or desirable for efficient sweeping. In other words, where a single means is employed to both beat and sweep the floor-covering, a sacrifice in both beating and sweeping efficiency must be made in order to secure both functions in a single unit, and where means designed exclusively for beating are employed, the machine can have but little sweeping action, which is essential in removing lint and other forms of surface litter.

With the above in view, one object of my invention is to provide a beating-rotor, the periodicity and sequence of which can be adjusted to any particular kind of carpet and for any kind of dirt lodged therein.

A further object is to provide a suction cleaner with a beating-element adapted to strike the carpet or object to be cleaned at the most favorable moment and in the most effective manner for good cleaning.

A still further object is to provide a suction-cleaner of the type described with means whereby it may both beat and sweep a floor covering in the most efficient manner.

With these and other objects in view my invention consists in the novel construction and arrangement of parts hereinafter described and more particularly pointed out in the appended claims.

Practical forms in which my invention may be embodied are shown in the accompanying drawings in which like reference characters refer to like parts throughout the views thereof.

In these drawings—

Figures 1, 2, 2A:
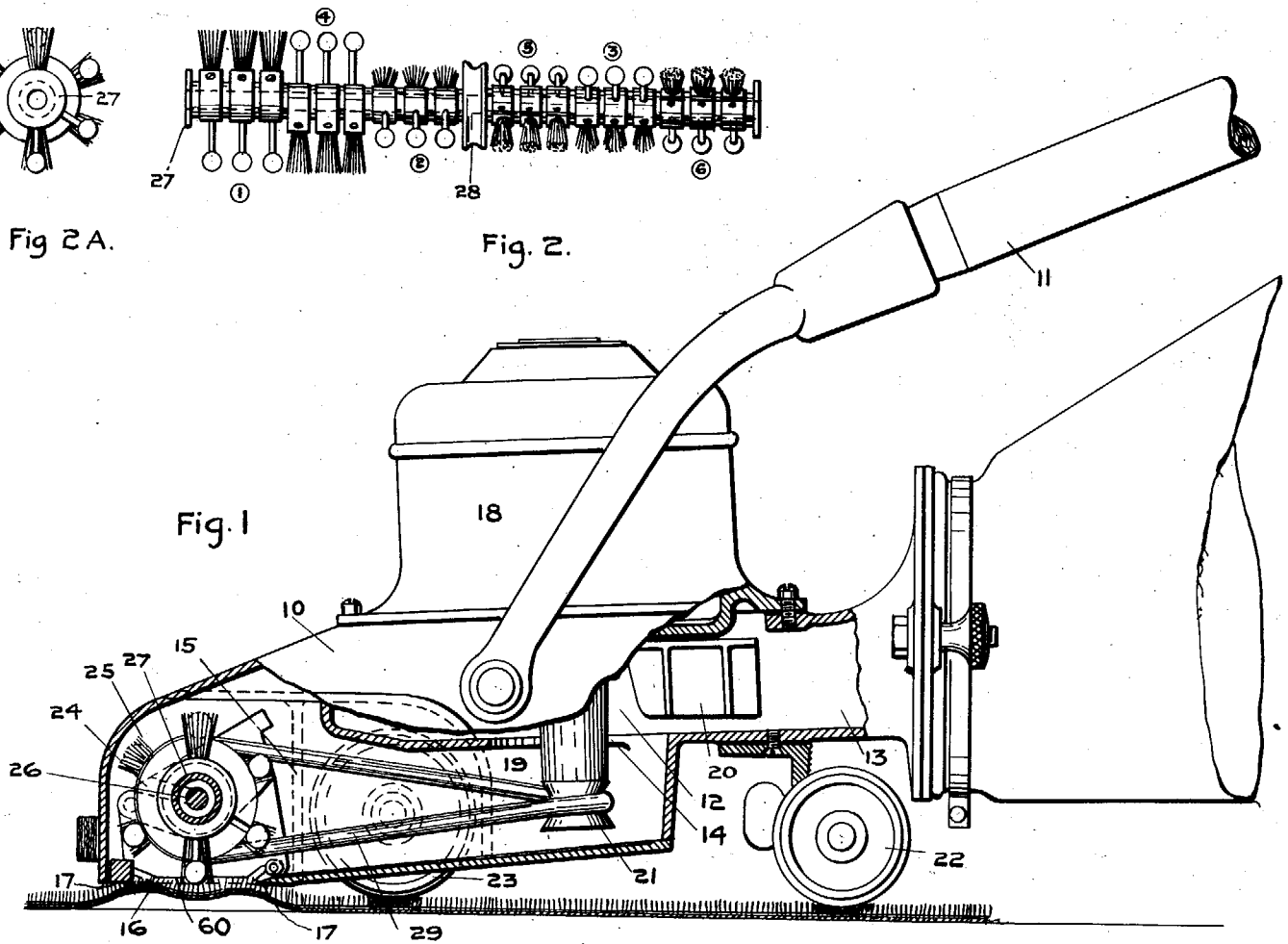
Figure 1 is a longitudinal sectional view of a suction-cleaner made in accordance with my invention, showing certain parts thereof in elevation.
Figure 2 is a view in elevation of the beating and sweeping rotor made in accordance with my invention.
Figure 3:
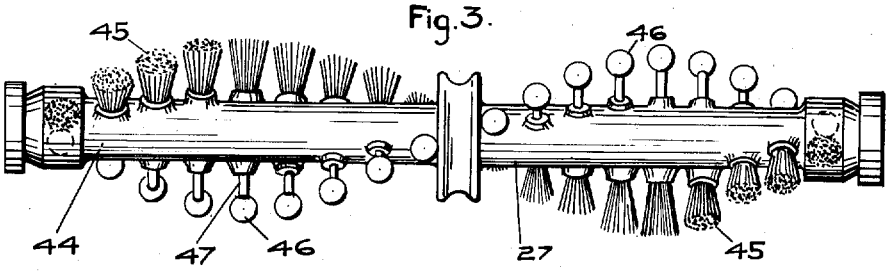
Figure 4:
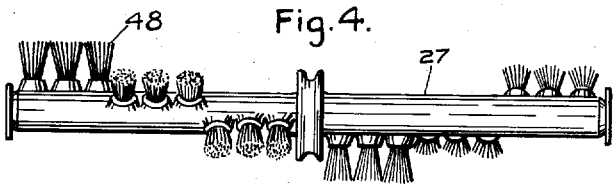
Figure 5:
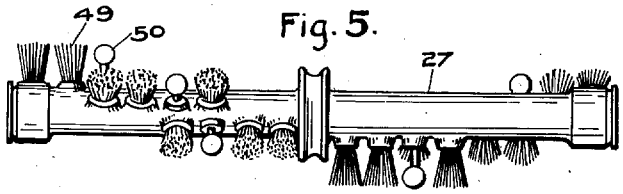
Figures 6, 7, 8, 9, 10:
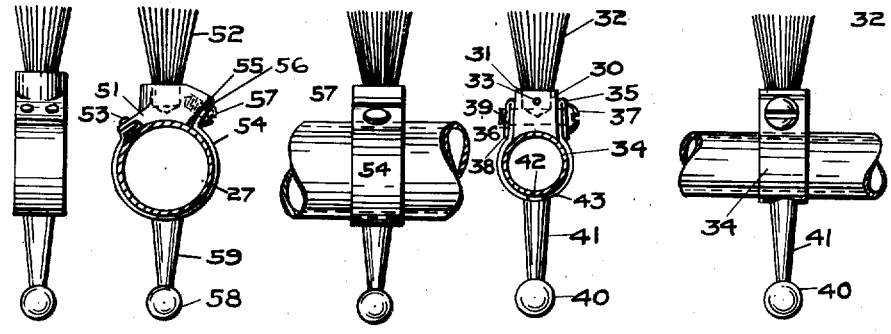

Figure 2[a] is an end elevation of Figure 2;

Figures 3, 4 and 5 are each views in elevation of modified forms of beating rotors;

Figures 6, 7 and 8 illustrate in detail a modified form of beating element; and

Figures 9 and 10 are detail views of a modified form of beating element.

I have incorporated my invention in a suction-cleaner formed of an aluminum casting 10 to which is pivotally secured a handle 11. In this casting 10 is formed a fan-chamber 12 having an outlet 13 adapted to receive a dust-collecting bag, and an inlet-opening 14 which connects with a suction-chamber 15 extending through the front of the casting and formed with a downwardly-facing suction-mouth 16 provided with lips 17.

On the casting 10 is mounted an electric-motor 18 the shaft 19 of which carries the fan-rotor 20 and the pulley 21, the latter being positioned in the rear of the suction-chamber. The rear of the casting is supported by means of the vertically-adjustable wheels 22 and the front by means of rotatably mounted carrier-wheels 23 positioned one at each side of the casting and to the rear of the suction-mouth in such a manner as not to prevent the object being cleaned from being raised freely to the suction-mouth.

Directly above the open mouth of the suction-chamber adjustable rotor-supports 24 are mounted on the end-wall 25, these supports in turn carrying shaft 26 upon which is rotatably mounted the hollow-tube 27 forming the body of the beating-rotor. This rotor-body is provided intermediate its ends with the pulley 28 which is connected to the pulley 21 on the motor-shaft by means of the belt 29 which is given a 90° turn.

In order that the periodicity and sequence of the blows struck the floor-covering may be varied as desired, I have, in the embodiment of my invention illustrated by Figures 1 and 2 provided the rotor-body 27 with a plurality of adjustable beating elements, the details of which are illustrated in Figures 9 and 10. Each beating element, as shown in these figures, comprises a block 30 provided in one face with a socket 31 adapted to receive a bunch of bristles 32 which are secured therein by means of a pin 33. In order to clamp the block 30 to the rotor-body 27 in any desired position, I have provided a clamp-strap 34 made of resilient material which is bent into a U-shape so as to encircle partially the rotor-body, and have its ends 35 and 36 lying along the side faces of the block at a slight angle thereto so as to allow it to clamp the rotor-body when the ends are drawn toward each other by means of a screw 37. The end 36 of the clamp is bent back as at 38 and both parts are provided with registering screw-threaded apertures 39 receiving the screw 37. On account of the resiliency of the material used in the clamping-strap the bent back portion 38 acts as a lock-nut for the screw. Each adjustable member, at a point opposite the bristle tufts, is provided with a beating-member comprising a smooth rounded contacting surface shown as a sphere 40 mounted on a rigid rod 41 which is provided with a reduced-portion 42 adapted to be upset in an aperture 43 in the clamping-strap 34. With this construction, I am able not only to secure a rotor that is in correct kinetic balance by properly distributing the masses around the center of gravity in any given plane, but am also able to secure an adjustable member for the rotor which is composed of one member designed exclusively for beating and another member designed primarily for sweeping.

In order to insure a positive blow upon the object being cleaned and to allow it to return to the most favorable position before the next succeeding blow is struck, I have arranged the adjustable elements, as shown in Figures 1 and 2 in groups of three, placed in a line running axially of the rotor-brush. These groups of adjustable elements in turn have been equally spaced circumferentially and axially so that they strike the object being cleaned in the order designated by numerals 1, 2, 3, 4, 5, and 6, Figure 2. Such an arrangement may be regarded as consisting of two helical rows of groups of adjustable elements. It is to be understood that I have shown the adjustable elements in groups of three for the sake of illustrating my invention only and that the number in each group and the positioning of each group may be varied as desired. With this construction, I am able to strike a more positive blow on the crest of the primary waves than would be the case if each bristle bunch or beating member was set at a different angle, because in this latter case each beating member would contact with the object being cleaned so closely after the next adjacent one as to beat the object before it has time to return to its most favorable position. It is evident that the time intervals between blows struck at adjacent points of the carpet will be greater and the return more complete as beating members are arranged in larger groups.

In Figure 3 I have illustrated a modification in which the beating-members and the sweeping-members are secured nonadjustably and directly to the rotor-body 44. The brushing member 45 consists of a series of bunches of soft bristles arranged about the rotor-body in a single helical row extending substantially from one end of it to the other and making a complete turn circumferentially about the rotor-body. The beating-member 46 consists of a series of spherical heads mounted upon rigid rods 47 which are mounted upon the rotor-body in a manner identical with that of the brushing-member, except that a beating-member is arranged diametrically opposite each sweeping-member.

In Figure 4 I have illustrated a form of beating and sweeping rotor in which both the beating and sweeping is performed by a series of bunches of bristles 48. These bunches of bristles I have arranged in groups of three placed in a line running axially of the rotor-body. These groups of bristle bunches in turn have been equally spaced circumferentially and axially so that they strike the object being cleaned consecutively in order from one end to the other. Comparing Figures 2 and 4 it will be noted in so far as the action of the bristle bunches alone is considered, that the periodicity of the two rotors is the same, but that the sequence is different, the rotor shown in Figure 2 being adapted to strike successive blows with the same time interval between them but at greater distances apart on the carpet, and this allows more time for the carpet or object being cleaned to return without reducing the number of blows per minute.

In Figure 5 I have illustrated a rotor-body provided with elements designed exclusively for beating and with elements designed exclusively for sweeping of the object being cleaned. These elements have been arranged in axially-aligned groups, and the groups in turn arranged in a helical row about the rotor-body. Each group of elements comprises a plurality of sweeping-members 49 together with one beating-member 50 and the beating-member is so arranged with respect to the sweeping-member of its own particular group and the group next adjacent thereto, that the path left on the object being cleaned by the beating-member is also covered by the sweeping-element which forms a part of the next adjacent group of elements. Such an arrangement as this insures the object being cleaned will be subjected to a sweeping action at every point along the line of the rotor-body.

Figures 6, 7 and 8 illustrate a modified form of adjustable elements wherein the block 51 receiving the tufts of bristles 52 has secured to it, by means of rivets 53, one end of a resilient strap 54 which encircles the rotor-body. The other end 55 of the resilient strap lies along the side-face of the block 51 and is provided with an aperture 56 through which extends a screw 57 having engagement with the block 51 and by means of which the strap 54 is clamped to the rotor-body. As previously described in connection with Figures 9 and 10, each adjustable member, at a point opposite the bristle tufts, is provided with a beating-member comprising a spherical head 58 mounted on a rigid-rod 59 which is secured through the clamping-strap 54.

Machines of the character described have a wide open mouth and are provided with guard fingers 60 extending across the mouth to limit the extent to which the floor covering is raised from the floor to prevent it being drawn too far into the suction mouth where it would have the undesirable effect of preventing efficient beating action.

The guard fingers further determine the shape that the object being cleaned will assume under the action of the suction, and as shown, are all made of the same shape so that the action of the beating elements will be uniform from one end of the suction mouth to the other.

Those skilled in this art will readily understand that the invention is not limited and restricted to the precise and exact embodiment of the same depicted in the drawings and described in detail above, but that the invention is susceptible of a variety of embodiments varying more or less in mechanical details but all incorporating the main underlying principles of my invention. All of such changes may be included in the structure without departure from the substance and essence of the invention and without sacrifice of any of its substantial benefits and advantages.

I claim:

1. In a suction-cleaning device, the combination of a casing having a mouth with means for moving a current of air therethrough and movably suspending the fabric to be cleaned thereat, and means for beating the fabric to be cleaned so as to impart a vibratory or fluttering motion thereto, the beating means comprising a rotating shaft, adjustable beating members on said shaft, whereby the periodicity and sequence of said beating means may be varied and separate means for brushing the surface of the fabric to be cleaned, said beating and brushing means mounted on the same rotating body.

2. In a suction cleaner, the combination of a casing provided with a suction mouth and means for supporting said casing with the plane of the suction mouth a substantial distance above the surface of the object to be cleaned, a series of guard fingers carried by said casing and extending across said suction mouth, and means for suspending said object to be cleaned against said guard fingers and for moving a current of air past said object and thru said casing, a rotor mounted in the casing, rigid beating elements having orbits of travel extending beyond the surface defined by the guard fingers fixed to the rotor and extending substantially from end to end thereof and brush members secured to the rotor.

3. In a suction cleaner, the combination of a casing provided with a suction mouth and means for supporting said casing with the plane of the suction mouth a substantial distance above an object to be cleaned, means carried by said casing acting to effect suspension of said object against said casing, a rotor mounted in the casing, rigid beating elements rigidly mounted on said rotor and arranged longitudinally of said mouth, and brush members secured to said rotor.

4. The combination with a suction cleaner, of a rotor therefor comprising a body, rigid beating members extending radially therefrom, and radially extending brushes mounted on said body, said beating members being adjustable circumferentially of said body.

5. The combination with a suction cleaner, of a rotor therefor comprising a body portion, and brushes and rigidly mounted beating members extending radially from said body portion, said brushes and beaters being adjustably secured to said body and adapted to be adjusted to various fixed positions circumferentially of said rotor body.

6. The combination with a suction cleaner, of a rotor therefor comprising a body portion, and rigid beating members rigidly mounted upon said body portion and adjustable circumferentially thereon.

7. The combination with a suction cleaner comprising a casing provided with a suction mouth and means for supporting said casing with the plane of said suction mouth a substantial distance above a floor covering and means carried by said casing acting to effect suspension of the floor covering against said casing at said mouth, of a rotor mounted in said casing above said mouth, said rotor having radially projecting rigid beating elements rigidly mounted thereon and arranged substantially from end to end of said suction mouth, and having brush members thereon circumferentially spaced from said beating elements and positioned longitudinally of said rotor to act upon the same portion of the floor covering as the beating elements.

HOWARD EARL HOOVER.